(No Model.)
M. BALMES.
MACHINE FOR GRINDING MOWING MACHINE KNIVES.
No. 481,886. Patented Aug. 30, 1892.
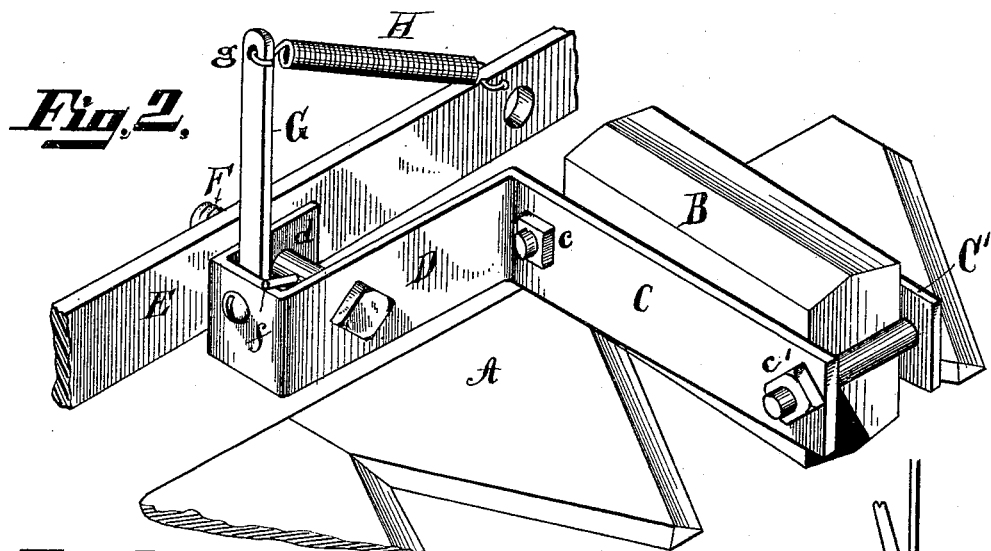
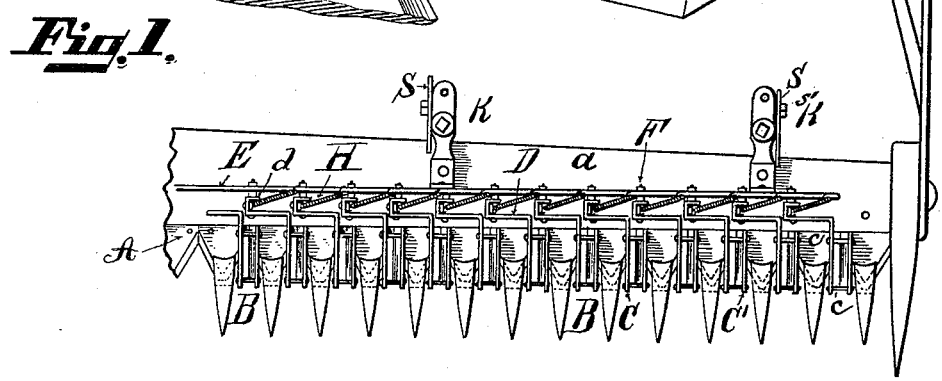
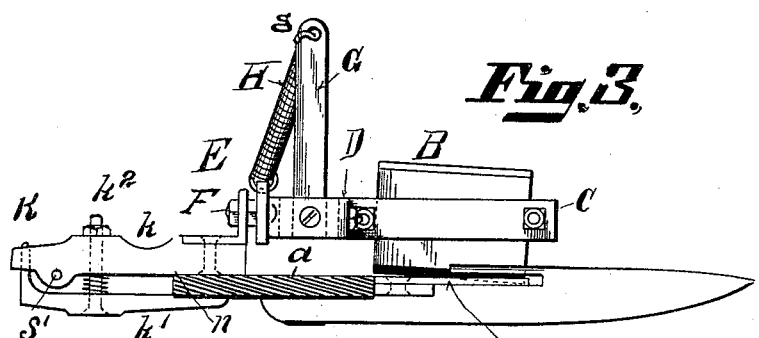
WITNESSES
D. W. Bradford
F. Clough
INVENTOR
Michael Balmes
by Parker & Burton
his Attorneys.

UNITED STATES PATENT OFFICE.

MICHAEL BALMES, OF DETROIT, MICHIGAN, ASSIGNOR TO THE ACME SAFETY EMERY WHEEL COMPANY, OF SAME PLACE.

MACHINE FOR GRINDING MOWING-MACHINE KNIVES.

SPECIFICATION forming part of Letters Patent No. 481,886, dated August 30, 1892.

Application filed December 16, 1891. Serial No. 415,205. (No model.)

*To all whom it may concern:*

Be it known that I, MICHAEL BALMES, a citizen of the United States, residing at Detroit, county of Wayne, State of Michigan, have invented a certain new and useful Improvement in Machines for Grinding Mowing-Machine Knives; and I declare the following to be a full, clear, and exact description of the invention, such as will enable others skilled in the art to which it pertains to make and use the same, reference being had to the accompanying drawings, which form a part of this specification.

This invention relates to machines for grinding knives of mowing and reaping machines, and has for its object a machine by which the cutting-knife of a mowing or reaping machine can be ground while the same is in motion on the cutter-bar and without removing the knives therefrom.

Heretofore machines of this kind have been used in which a block of grinding material, usually a block of emery pressed into shape, has been held by a movable arm against the knife in such a way as to grind or abrade the beveled edge of the knife as the knife is reciprocated under it. The movable arm on which the block of grinding material was mounted was hinged either behind or in front of the tooth and permitted the block to rise and fall as the knife reciprocated under it. In the machines heretofore used the grinding-block has been hung on an arm pivoted either behind or in front of the knives to be operated upon and swinging in the sector of a circle at right angles to the travel of the knives, and in consequence of this peculiarity of construction the edge of the grinding-block did not rise and fall with a parallel motion, but with an angular motion, and either one end or the other, depending on the position of the pivot on which the block turned, would rise the faster, and as the motion of the grinding-block was reversed on reaching the upper part of its throw or the lower part of its throw it would for an instant of time remain suspended, while the knife reciprocating under it and causing its motion would be drawn away from it. The block getting under motion again would move rapidly until it came in contact with a knife and would strike the knife a sharp blow, generally at a point of about an inch or an inch and a half back of the point of the knife. This resulted in either rapidly wearing away the block, or, if the block was made sufficiently hard to stand the blow, in breaking and crumbling off the edge of the knife and destroying its usefulness. These defects I have remedied by the device shown in the following drawings and hereinafter described, in which I so construct the machine that the block, instead of rising in a curved line, rises practically perpendicular, or in a line such that its grinding-surface always remains parallel to itself. In the form shown in the drawings, however, in addition to the perpendicular motion of the block there is a slight rocking motion on a line across and at right angles to the line of motion of the knives.

In the drawings, Figure 1 is a plan view of a portion of a cutter-bar with my grinding-machine placed above it. Fig. 2 is an enlarged detail of one of the grinding-blocks and its actuating attachments. Fig. 3 is an elevation of one finger-bar and the grinding-block and its attachments placed above it. It shows, also, in section the means for attaching the sections of grinding-blocks to the cutter-bar. Fig. 4 is an adjusting-templet for adjusting the grinding-machine to the finger-bar.

A represents a knife of a mowing-machine; B, a block of grinding material; C C', the clamps by which the block of grinding material is held; D, an arm extending from the clamp to the rod E; F, the pin or bolt forming a journal on which the arm D turns; G, a branch or arm attached to the arm D and extending upward to receive the holding-spring H. The rod E extends the entire length of the cutter-bar, or so far along the cutter-bar as it may be desired to place these sections of grinding-blocks. It is perforated behind each tooth and has journaled upon it by short bolt or journal F the arm D.

In order to secure the advantage of a long bearing, I bend or turn the arm D into a U shape and pass the bolt or journal F through both branches of the U at the end of the arm D. One of these branches is shown at D and the other at $d$. The journal F is held from turning with respect to the rod E by means of a nut upon it on either side of the rod E, both of which are turned tight against the rod E, so as to prevent the journal F from turning on its center. Through the journal F is a hole in which is inserted a pin $f$, that may be placed at any angle with respect to the arm D by turning the journal F in its bearing in the rod E until the pin $f$ has taken the desired position. The pin $f$ projects over the bend or turn of the U part between arm D and $d$ and prevents that end of the arm D from rising too high. It is adjusted so as to permit the block B to rest on the edge of the knife A when the knife A has been drawn so far to one side of the block B that the lower edge (what may be termed the "knife-edge") of the block B rests in the heel between two adjacent knives. The spring H is hooked into the top $g$ of the stem G, and also to the rod E, extending from the stem G across and beyond the journal F, so as to produce a constant pull on the upper end of the stem G, tending to lift the turning part of the arm D and depress the block B. The clamping pieces C and C' are held together by bolts and nuts $c$ and $c'$, and the block B is held between them adjustably, the usual adjustment being such that the lower or knife edge of the block B rests on a line parallel with a line passing across the bevel surface of the knife A at right angles to the line of motion of the knives. To secure this adjustment, the block B is placed loosely between the clamps C and C' and allowed to rest on the beveled edge of the knife, and is adjusted to attach the beveled edge at both its top and bottom lines, and the clamp is then made fast on the block. As the knives reciprocate under the block the block rises and rubs along the beveled edge of the knife; but inasmuch as its lower or knife edge rises parallel to itself the lower or grinding surface of the block constantly touches the beveled edge of the knife at both its top and bottom lines and grinds it off smoothly and without striking it or breaking either it or the block. The spring H holds the block B down on the knife-edge and prevents it from being thrown out of contact as the knife moves backward and forward. There is one such block with its supporting-arm for each section of knife along the knife-bar, each one being moved independently of the others, but all being held to the common holding-rod E. The holding-rod E is itself secured to the knife-bar of the machine by means of a clamp K, of which the upper part $k$ is furnished with an L-shaped arm adapted to be bolted to the rod E. The under portion of the part $k$ at its forward end fits smoothly over the knife-bar $a$. The lower jaw $k'$ of the clamp K is fitted to the under side of the knife-bar $a$ and the two are secured together by means of a bolt and nut $k^2$. An adjusting-finger S, provided with a slot $s$, is held to the jaw $k$ by a set-screw $s'$ and is adjusted to the particular machine to which the grinder is to be attached by placing the grinder in position, moving the finger S along the set-screw $s'$ until the notch $n$ on its forward end drops over the corner of the knife-bar $a$, and set-screw $s'$ is then tightened, the jaws of the clamp K tightened together and secured upon the knife-bar $a$, and the grinder is ready for use. After the knives have been sharpened the grinder is removed without disturbing the finger S, and the grinder may be afterward replaced upon the the machine at any time, and so long as the finger S remains undisturbed it will take the proper position without any special care being exercised.

Having thus described my invention, what I claim as novel is—

1. In combination with the cutting-knives and cutter-bar of a mowing-machine, a holding-bar and a grinding-block movably secured thereto by a clamping-arm adapted to have vertical movement and to hold said grinding-block with its grinding-surface constantly parallel to itself or to a given surface, substantially as and for the purposes described.

2. In combination with the cutting-knives of a mowing-machine, a grinding-block secured to an arm adapted to turn on a journal having its axis at right angles to the line of movement of the cutting-knives, substantially as and for the purpose described.

3. In a machine for sharpening the knives of mowing-machines, the combination of a holding-rod secured to the cutter-bar, a block of grinding material and a clamp securing the same, a journal secured to said holding-rod and having journaled upon it the said block-holding clamp, and a tension-spring adapted to hold said grinding-block downward, said journal having its axis at right angles to the line of movement of the cutter-knives, substantially as and for the purposes described.

4. In a machine for grinding the knives of mowing-machines, the combination of the holding-rod E, clamps C C', arm D $d$, journal F, and adjusting-pin $f$.

5. In a grinding-machine for mowing-machine knives, the combination of a grinding-block and a holding-clamp therefor adapted to hold said block with its lower or grinding surface constantly in contact with the beveled edge of the knife beneath it and with its line of contact constantly parallel to said beveled edge, substantially as and for the purpose described.

In testimony whereof I sign this specification in the presence of two witnesses.

MICHAEL BALMES.

Witnesses:
MARION A. REEVE,
CHARLES F. BURTON.